United States Patent
Siler et al.

(10) Patent No.: US 9,557,192 B2
(45) Date of Patent: Jan. 31, 2017

(54) ELECTRONIC CENTERING INDICATOR FOR CLOCKSPRING ASSEMBLY

(71) Applicant: Alps Electric Co., Ltd., Tokyo (JP)

(72) Inventors: Donald J. Siler, Grand Blanc, MI (US); Anthony Trask, Waterford, MI (US)

(73) Assignee: ALPS ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/995,603

(22) Filed: Jan. 14, 2016

(65) Prior Publication Data

US 2016/0209244 A1 Jul. 21, 2016

Related U.S. Application Data

(60) Provisional application No. 62/104,270, filed on Jan. 16, 2015.

(51) Int. Cl.
| | |
|---|---|
| *H01R 3/00* | (2006.01) |
| *G01D 5/26* | (2006.01) |
| *H01R 35/02* | (2006.01) |
| *B60R 16/027* | (2006.01) |
| *G01B 11/27* | (2006.01) |

(52) U.S. Cl.
CPC ............... *G01D 5/26* (2013.01); *B60R 16/027* (2013.01); *G01B 11/27* (2013.01); *H01R 35/025* (2013.01)

(58) Field of Classification Search
CPC ... H01R 35/025; H01R 35/02; H01R 2201/26; H02G 11/00; B60R 16/027
USPC .................................................. 439/164, 15
See application file for complete search history.

(56) References Cited

U.S. PATENT DOCUMENTS

| | | | | |
|---|---|---|---|---|
| 1,457,040 A | * | 5/1923 | McManus | A61C 13/20 164/250.1 |
| 5,066,239 A | * | 11/1991 | Bannai | H01R 35/025 439/13 |
| 5,429,517 A | * | 7/1995 | Bolen | B60R 16/027 439/15 |
| 5,460,535 A | * | 10/1995 | Bolen | B60R 16/027 439/15 |
| 5,487,667 A | * | 1/1996 | Bolen | F16F 1/10 439/15 |
| 5,490,793 A | * | 2/1996 | Bolen | F16F 1/10 439/15 |
| 5,773,776 A | * | 6/1998 | Uleski | B60R 16/027 200/61.27 |
| 5,884,936 A | * | 3/1999 | Matsu | B60R 16/027 280/728.2 |

(Continued)

*Primary Examiner* — Abdullah Riyami
*Assistant Examiner* — Vladimir Imas
(74) *Attorney, Agent, or Firm* — Brinks Gilson & Lione (57) ABSTRACT

A clockspring assembly is provided having means to indicate that the clockspring assembly is properly centered upon installation in a motor vehicle. The clockspring assembly includes a hub and a rotor that is rotatable relative to the hub. A ribbon cable is wound about the rotor and provided with one end attached to the rotor and another end attached to the hub. An electronic centering indicator is mounted to the hub and is configured to indicate a centered position of the hub relative to the rotor as a result of a condition occurring when the hub becomes centered with the rotor. Upon the occurrence of the condition, the centering indicator is configured to provide an electronic signal indicating that the clockspring is properly centered.

20 Claims, 5 Drawing Sheets

(56) References Cited

U.S. PATENT DOCUMENTS

| | | | | |
|---|---|---|---|---|
| 6,126,461 | A * | 10/2000 | Bolen | H01R 35/02 |
| | | | | 439/15 |
| 6,213,797 | B1 * | 4/2001 | Best | B60R 16/027 |
| | | | | 439/15 |
| 6,425,774 | B1 * | 7/2002 | Oota | B60R 16/027 |
| | | | | 439/15 |
| 6,538,220 | B2 * | 3/2003 | Durocher | B60Q 1/1461 |
| | | | | 200/61.54 |
| 6,948,706 | B1 * | 9/2005 | Wyatt | B60R 16/027 |
| | | | | 267/154 |

\* cited by examiner

ELECTRONIC CENTERING INDICATOR FOR CLOCKSPRING ASSEMBLY

CROSS REFERENCE TO RELATED APPLICATION

This application claims the benefit of U.S. provisional application No. 62/104,270 filed on Jan. 16, 2015, which is herein incorporated by reference in its entirety.

BACKGROUND

1. Field of the Invention

The present invention generally relates to clockspring assemblies. More specifically, the invention relates to an electronic centering indicator for a clockspring assembly.

2. Description of Related Art

Substantially all automotive vehicles are now manufactured with one or more airbags. Typically, a driver's side airbag is provided in the steering wheel facing the driver of the vehicle, and a second airbag is provided in the portion of the instrument panel facing the front passenger seat of the vehicle. The present discussion concerns the airbag located in the steering wheel.

Because the various collision sensors of an automotive vehicle provide a signal causing inflation of the airbag instantaneously with initiation of a collision event, and sometimes prior to the collision event, the airbag must be in continuous electrical connection with the collision sensors and other electronics in the vehicle body. Thus, a driver side airbag requires that an electrical connection be continuously provided between the airbag, as it rotates with the steering wheel, and the stationary sensors and other electronics.

Electrical connections between rotatable and stationary parts are known. In one well known connection, an electric brush rests upon a conductive ring, with one of the parts being rotatable. However, with this type of connection there is a risk, during the early or pre-stages of a collision, that the brush may separate or lose contact with the conductive ring. This loss of contact may create a transient failure in the electrical connection, resulting in delayed deployment of the airbag.

Another type of connection between rotatable and stationary parts is a clockspring assembly or connector. Clockspring assemblies typically include an outer housing, a rotor member and a "clockspring." The clockspring is a coil of flat cable having one end connected to a plug or terminal on the outer housing and the other end connected to a plug or terminal on the rotor. The terminal on the outer housing, also referred to as the hub, is further connected to the electronics in the car body and the terminal on the rotor is connected to other electronics on the steering wheel associated with the airbag. As the steering wheel rotates, the clockspring of the clockspring assembly is wound and unwound, depending on the direction of rotation, and provides a continuous wired connection between the two parts.

Clockspring assemblies are typically manufactured at the site of a specialty manufacturer and then shipped to the vehicle manufacturer where they are further installed with the steering wheel. Because of this, it is important that the position of the outer hub with respect to the rotor member remain in a known position so that the clockspring assembly can be installed in a centered position on the steering wheel. Such a position is one where the clockspring is capable of an equal amount of rotation in either direction, without the clockspring becoming completely wrapped or unwrapped around the rotor.

In view of the above, it is apparent that there is a need for a mechanism that ensures that the clockspring assembly is properly centered once installed on the column of the steering wheel, before the vehicle leaves the assembly plant, removing the possibility of over rotation of the clockspring assembly due to misassembly.

SUMMARY

In satisfying the above need, as well as overcoming the enumerated drawbacks and other limitations, the present invention provides a clockspring that provides an indication that the hub and rotor are properly centered with respect to one another.

In one aspect the present invention provides an clockspring assembly having a rotor with an inner circumferential wall; a hub mounted to the rotor and being rotatable relative to the rotor; a ribbon cable wound about the hub and positioned within a chamber defined between the hub and rotor, the ribbon cable having a first end attached to the rotor and a second end attached to the hub; an electronic centering indicator mounted to the hub and configured to indicate a centered position of the hub relative to the rotor as a result of a condition occurring when the hub becomes properly centered with the rotor, the centering indicator being configured to provide an electrical signal upon detecting the existence of the condition and the signal indicating that the clockspring is properly centered.

In another aspect, the centering indicator is a sensor.

In a further aspect, the sensor is mounted in a circumferential wall of the hub and opposes the ribbon cable.

In an additional aspect of the invention, the sensor senses an indicium provided on the ribbon cable.

In still another aspect, the indicium is detected by the sensor via a noncontact method.

In yet a further aspect, the indicium is optically detected by the sensor.

In an additional aspect of the invention, the indicium is a region of color.

In yet another aspect, the indicium is detected by the sensor via a contact method.

In still a further aspect, the indicium is a raised projection on the surface of the ribbon cable.

In an additional aspect, the raised projection projects radially outward from the surface of the ribbon cable.

In another aspect, the sensor is a tact sensor configured to engage a raised projection as the indicium when the raised projection moves past the sensor during relative rotation of the hub and rotor.

In a further aspect of the invention, an aperture is formed in an outer circumferential wall of the hub and the indicator is a sensor being mounted in the aperture.

In an additional aspect, the indicator includes a gear assembly driven by rotation of the rotor.

In yet another aspect, the gear assembly includes a drive gear mounted for rotation with the rotor and a driven gear supported by the hub in a fixed location relative to the rotor.

In still further aspect of the invention, the drive gear is a ring gear fixedly mounted to the rotor.

In an additional aspect, the driven gear rotates a threaded portion coupled to a non-rotatable follower member, the follower member moving axially with rotation of the threaded portion by the driven gear.

In still another aspect, the follower member includes a threaded part correspondingly engaging the threaded portion rotated by the driven gear, the follower member further including at least one electrical contact.

In yet a further aspect, the indicator includes a switch configured to be engaged by the at least one electrical contact during axial movement of the follower member.

In an additional aspect, engagement of the switch by the at least one electrical contact closes the switch indicating proper centering of the hub relative to the rotor.

In another aspect of the invention, the rotor is mounted to a steering assembly of a motor vehicle and is rotatable with rotation of a steering column of the motor vehicle.

Further objects, features and advantages of this invention will become readily apparent to persons skilled in the art after a review of the following description, with reference to the drawings and claims that are appended to and form a part of this specification.

DETAILED DESCRIPTION

Figure 1:
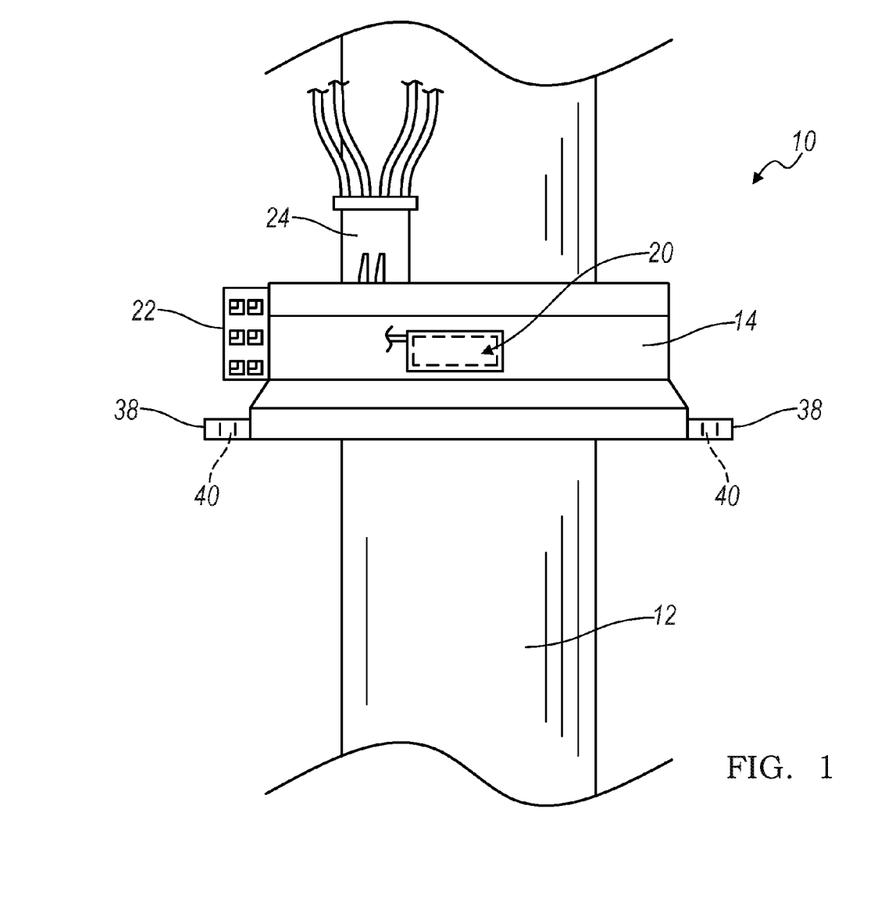
FIG. 1 is a side elevational view of an clockspring assembly embodying the principles of the present invention installed on the column of a steering wheel assembly.

Referring now to the drawings, a clockspring assembly embodying the principles of the present invention is illustrated therein and generally designated at 10. The clockspring assembly 10 is mounted on the column 12 of a steering wheel assembly, the steering wheel of which is not illustrated. As its primary components, and as more fully seen in FIG. 2A, the clockspring assembly 10 includes four basic components: an outer housing or hub 14, a rotor 16, a ribbon cable 18 and a centering indicator mechanism 20. Each of the hub 14 and rotor 16 and further includes terminals, respectively designated at 22 and 24. The terminals 22, 24 electrically connect the clockspring assembly 10 to additional electronics and sensors of the vehicle, in the case of terminal 22, or to the airbag (not shown) of the steering wheel assembly, in the case of terminal 24.

In an actual implementation of a clockspring assembly 10 incorporating the principles of the present invention, the hub 14 and rotor 16 may take on a variety of shapes and configurations, but for the purposes of the present description the construction is illustrated in one of its most simple forms.

Figure 2A:
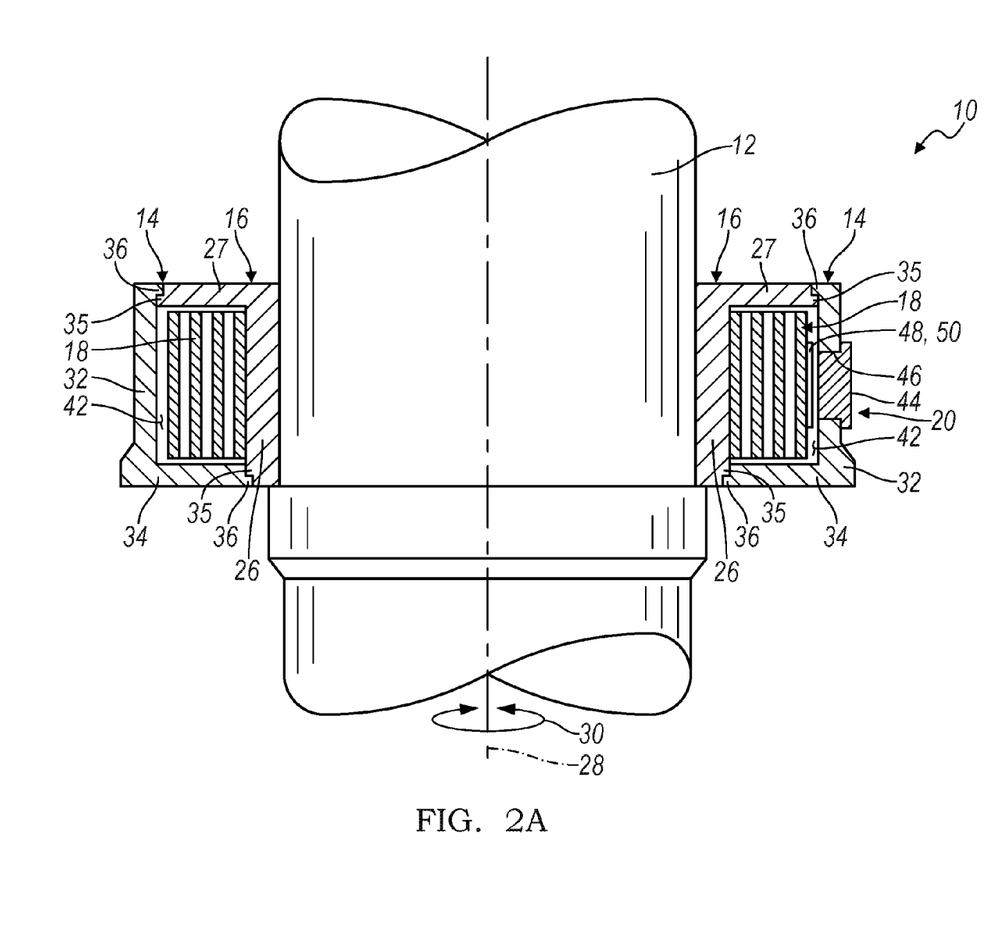
FIG. 2A is a partial sectional view through the clockspring assembly seen in FIG. 1.

As seen in FIG. 2A, the rotor 16 includes a circumferential wall 26 that is fixedly mounted to the steering column 12 such that it will rotate with rotation of the steering column 12. This circumferential wall 26 defines the radially innermost wall of the clockspring assembly 10. Extending radially outward from one end of the circumferential wall 26 is a radial flange 27. The radial flanged 27 maybe integrally or unitarily formed with the circumferential wall 26. The rotor 16 can be made of a variety of materials, including metal or plastic.

The hub 14, like the rotor 16, can be made of a variety of materials including metal or plastic. The hub 14, as illustrated, includes a circumferential wall 32 from which extends a radial flange 34. This circumferential wall 32 engages at one end the distal end of the radial flange 27 of the rotor 16. Similarly, the distal end of the radial flange 34 of the hub 14 engages the circumferential wall 26 of the rotor 16. These engagements are provided such that the hub 14 and the rotor 16 are rotatable with respect to one another. The engagements may therefore be provided in any manner that facilitates this purpose, and, in the illustrated embodiment, the engaged ends of the rotor 16 and the hub 14 are each provided with corresponding interlocking lips 35, 36.

Additionally, the hub 14 is provided with multiple anchor points 38, in the form of tabs projecting radially outward from the cylindrical wall 32. The anchor points 38 preferably include apertures 40 through which fasteners (not shown) may be inserted to engage with other components of the vehicle. By engaging the anchor points 38 with other components of the vehicle, the hub 14 is stationarily fixed.

Together, the hub 14 and the rotor 16 defined a chamber 38 within which the ribbon cable 18 is received and wound about the rotor 14. The ribbon cable 18 is a flat, cable having multiple conductors that run parallel to each other within a long thin strip of insulating material. For the purpose of clarity, the ribbon cable 18 is illustrated without delineating the individual components of the ribbon cable 18. Additionally, a first, inner end of the ribbon cable 18 is electrically connected to the terminal 24 of the rotor 16 and a second, outer end of the ribbon cable 18 is electrically connected to the terminal 22 of the hub 14. Since the hub 14 is stationary, as further discussed below, the inner end of the ribbon cable 18 will move about a central axis 26 of the steering column 12. Rotation of the steering column 12, and therefore the rotor 16, is generally indicated by 30 and is depicted in FIG. 2A.

As previously discussed, it is important that the position of the hub 14 with respect to the rotor 16 remain in a centered position, once assembled, prior to and during installation of the clockspring assembly 10 on the steering column 12. In such a position, the clockspring assembly 10 will be capable of an equal amount of rotation, in either direction, without the ribbon cable 18 becoming completely wrapped or unwrapped around the rotor 16. The centering indicator 20 is provided to ensure that upon installation the clockspring assembly 10 is centered.

As seen in FIG. 2A, a first embodiment of the centering indicator 20 is provided. In this embodiment, a sensor 44 is mounted within a window or aperture 46 defined in the circumferential wall 32 of the hub 14. Provided on the surface of the ribbon cable 18 is an indicium 48 that is detected by the sensor 44. When the indicium 48 is detected by the sensor 44, it is an indication that the hub 14 and rotor 16 are in the centered position of the clockspring assembly 10.

Figure 3A:
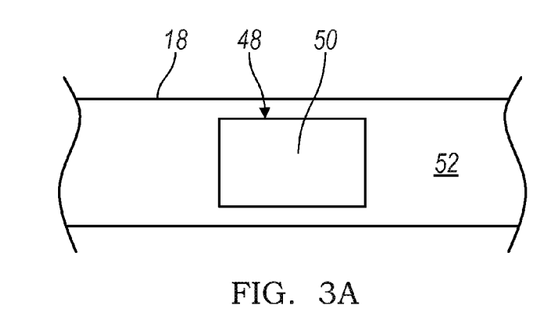
FIG. 3A is a side elevational view of a portion of a clockspring in accordance with the embodiment seen in FIG. 2A.

Two alternatives are provided for this first embodiment of the centering indicator 20. In the first alternative, as seen in FIGS. 2A and 3A, the indicium 48 is of the nature that it may be optically or proximally detected by the sensor 44. As such, the indicium 48 may be a section 50 of distinguishable color, reflective material or other optically or proximally perceivable material provided on the outer surface 52 of the ribbon cable 18. In the illustrated instance, the section 50 is a region of distinguishable color and the sensor 44 is configured to optically detect the presence of the color or the change in color as the section 50 is beneath or passes beneath the sensor 44.

Figure 2B:
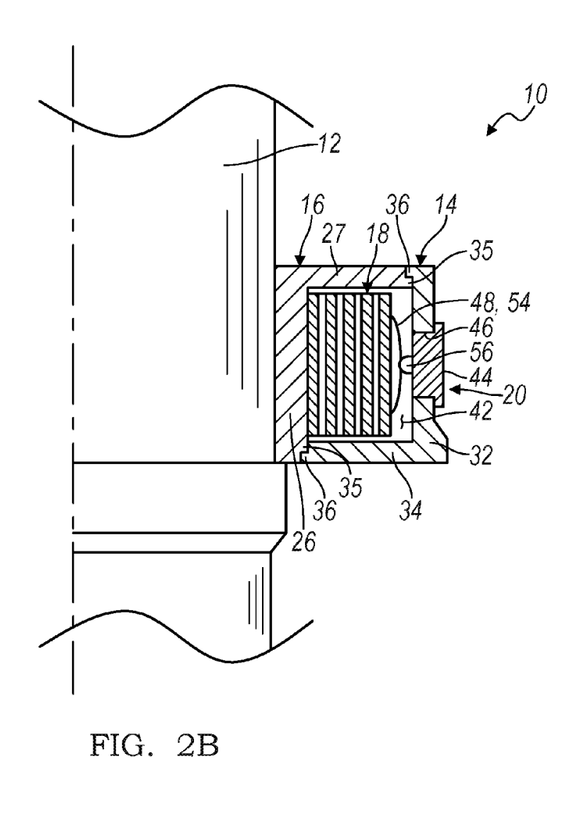
FIG. 2B is a partial sectional view through the clockspring assembly seen in FIG. 1 according to a second embodiment.
Figure 3B:
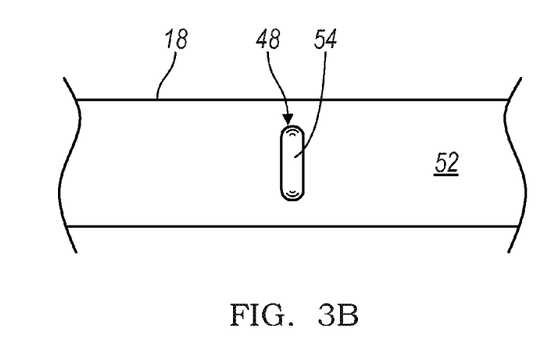
FIG. 3B is a side elevational view of a portion of a clockspring in accordance with embodiment seen in FIG. 2B.

In the second alternative, shown in FIGS. 2B and 3B, the indicium 48 is a physical projection or bump 54 provided on the surface 52 of the ribbon cable 18. In this instance, the sensor 44 is a tact or physical switch that, upon engagement of its contact member 56 with the projection or bump 54, indicates that the hub 14 and rotor 16 of the clockspring assembly 10 are centered with respect to each other.

Figure 4:
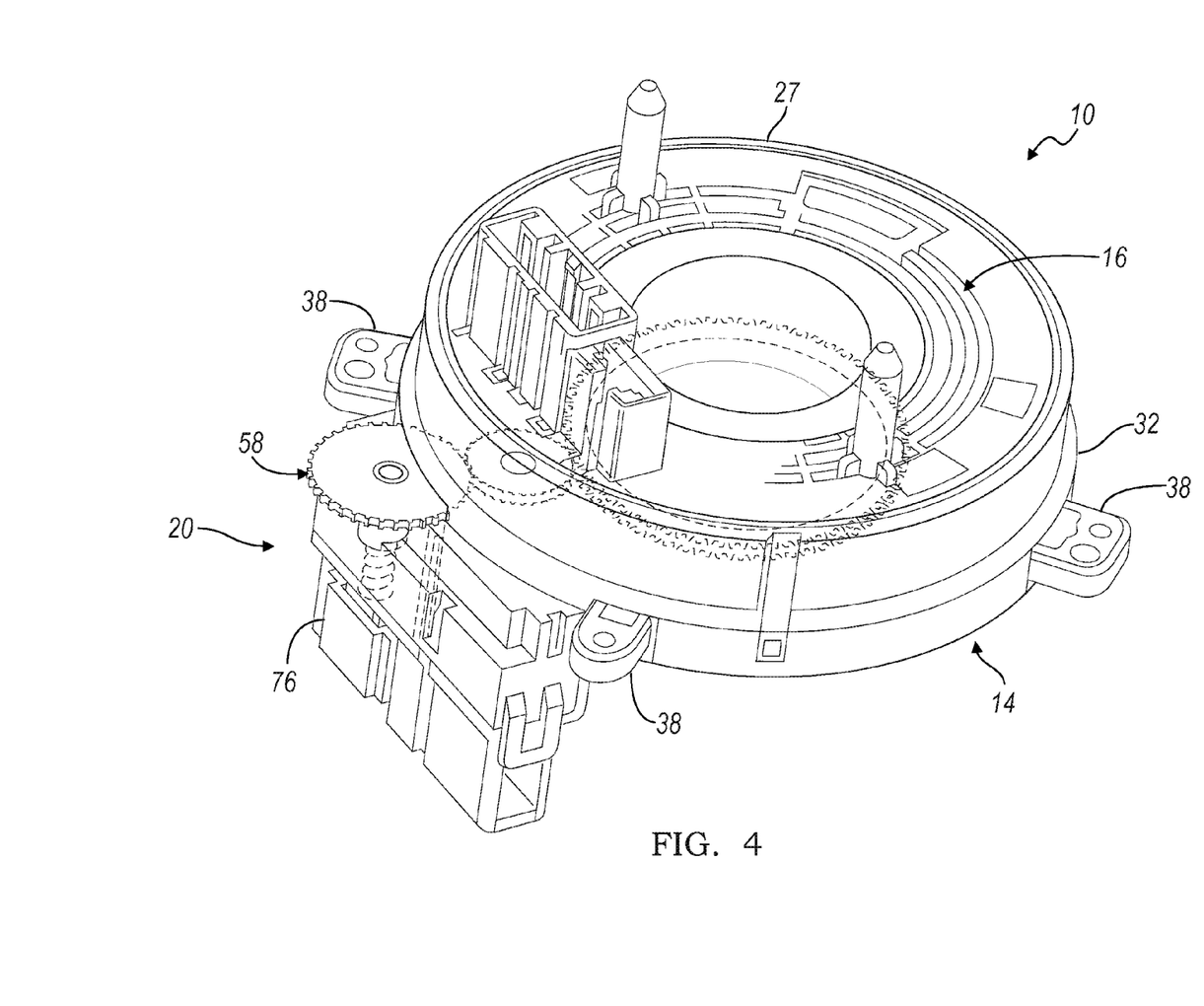
FIG. 4 is a perspective view of an clockspring assembly, not mounted to a steering wheel column, embodying the principles of the present invention in an additional embodiment.
Figures 5, 6:
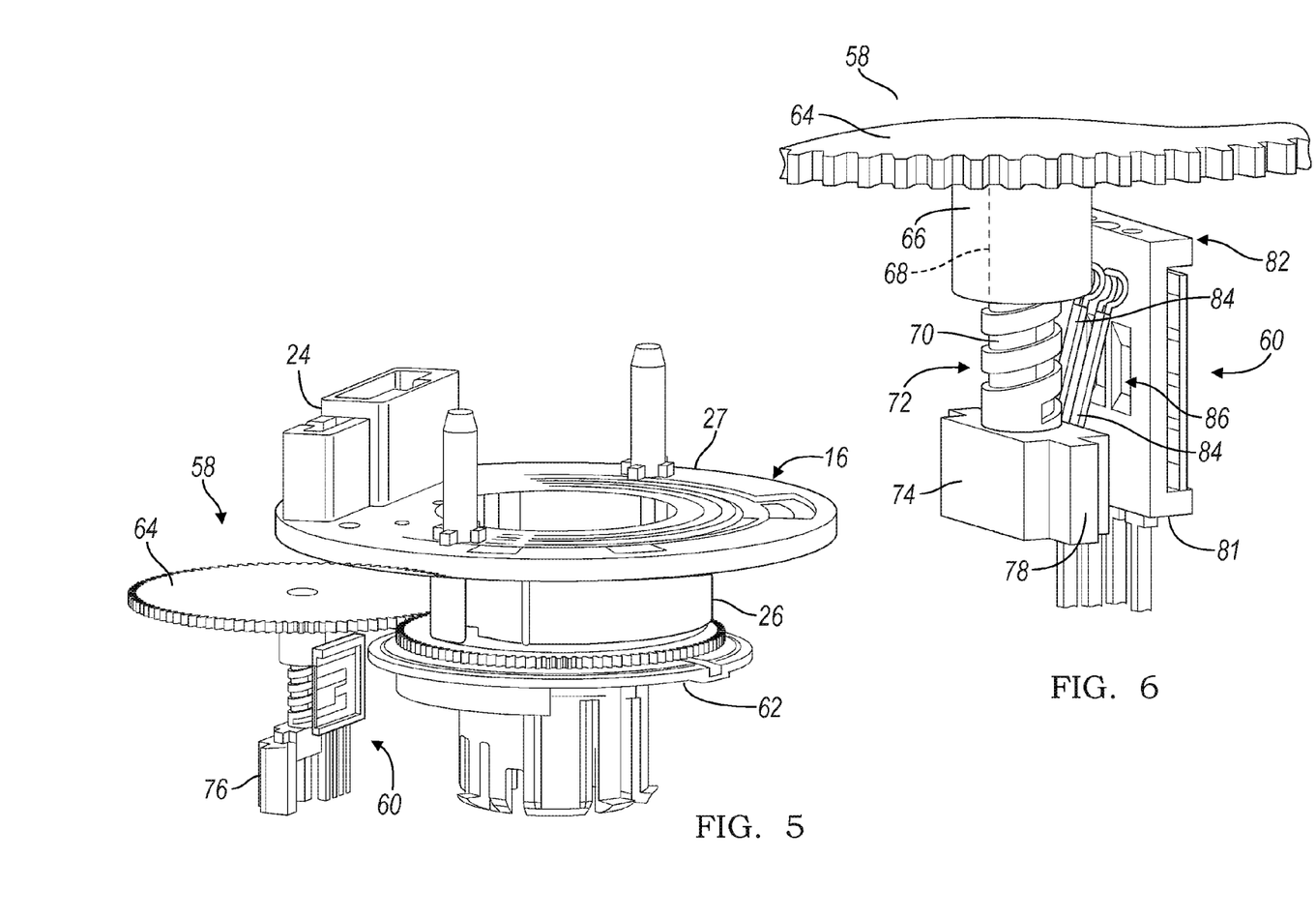
FIG. 5 is perspective view of the clockspring seen in FIG. 4 with the hub removed and illustrating the rotor and the mechanism for indicating if the clockspring assembly is centered.
FIG. 6 is an enlarged view of the portion of the clockspring assembly encircled by line 6-6 in FIG. 5.

Referring now to FIGS. 4, 5 and 6, illustrated therein is a second embodiment of a clockspring assembly 10 incorporating the principles of the present invention. In this embodiment, the centering indicator 20 includes a gear assembly 58 utilized in conjunction with a contact switch 60 for determining if the clockspring assembly 10 is properly centered.

Turning to FIG. 5, to better illustrate the present embodiment of the centering indicator 20, the clockspring assembly 10 is shown with the hub 14 and the ribbon cable 18 removed therefrom.

The gear assembly 58 includes a ring gear 62 that rotates with the rotor 16. Since the ring gear 62 rotates with the rotor 16, the ring gear 62 may be unitarily formed with the rotor 16 or may be integrally provided with the rotor 16 to rotate therewith. The ring gear 62 may be provided at various locations on the rotor 16, but is preferably provided on one axial end of the rotor 16 so as to circumscribe the circumferential wall 26. As shown, the ring gear 62 is located about the circumferential wall 26 opposite from the radial flanged 27.

The ring gear 62 is engaged by a driven gear 64. As the ring gear 62 rotates, the driven gear 64 also rotates. In order to reduce the overall size of the driven gear 64, and idler gear (not shown) may be provided between the ring gear 62 and the driven gear 64. Extending from a lower surface of the driven gear 64 is a central collar 66 that also rotates with the driven gear 64. The central collar 66 is internally threaded and receives therein a correspondingly threaded portion 70 of a follower shaft 72. The follower shaft 72 is joined with a follower block 74 that is received within a guide 76 that is non-rotatably coupled to the hub 14 or a portion of the vehicle. Rails 78, formed on the follower block 74 slidingly ride within channels (not shown) formed within the guide 76 and aligned in the direction of the follower shaft 72 interaction between the and the channels thus prevent rotation of the follower block 74 within the guide 76. Since the follower shaft 72 and follower block 74 are configured so as not to rotate, upon rotation of the driven gear 64, the threaded portion 70 of the follower shaft 72 axially moves up or down, depending on the direction of rotation, within the caller 66. This upward or downward movement in turn causes upward or downward movement of the follower block 74 relative to the guide 76.

As seen in FIG. 6, extending off of the follower block 74 are a pair of electrical contacts 80. The electrical contacts 80 correspondingly move with the follower block 74. The contacts 80 are biased against the housing 81 of a lead block 82 within which a pair of electrical leads 84 is provided. The housing 81 includes a pair of apertures 86 through which the leads 84 are exposed. As the contacts 80 are moved along the lead block 82 the contacts 80 move into the apertures 86 and engage the leads 84. When the contacts 80 engage the leads 84, the circuit of the contact switch 60 is closed causing a signal to be sent from the clockspring assembly 10 to the vehicle indicating that the rotor 16 and hub 14 are centered properly. This happens only once, during initial assembly of the clockspring assembly 10 on the steering column 12. Opposite from the driven gear 64, the central shaft 66 is provided with a threaded end 68.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

The invention claimed is:

1. A clockspring assembly comprising:
a rotor having an inner circumferential wall;
a hub mounted to the rotor and being rotatable relative to the rotor;
the rotor and the hub cooperatively defining a chamber;
a ribbon cable positioned within the chamber and coiled around the hub, the ribbon cable having first and second ends, the first end being attached to the rotor and the second end being attached to the hub;
an electronic centering indicator mounted to the hub and being configured to indicate a centered position of the hub relative to the rotor as a result of a condition occurring when the hub becomes centered with the rotor, the centering indicator configured to provide an electrical signal upon detecting the existence of the condition and the signal indicating that the clockspring is centered.

2. The clockspring assembly according to claim 1, wherein the centering indicator is a sensor.

3. The clockspring assembly according to claim 2, wherein the sensor is mounted in a circumferential wall of the hub and opposes the ribbon cable.

4. The clockspring assembly according to claim 2, wherein the sensor senses an indicium provided on the ribbon cable.

5. The clockspring assembly according to claim 4, wherein the indicium is detected by the sensor via a non-contact method.

6. The clockspring assembly according to claim 4, wherein the indicium is optically detected by the sensor.

7. The clockspring assembly according to claim 6, wherein the indicium is a region of color.

8. The clockspring assembly according to claim 4, wherein the indicium is detected by the sensor via a contact method.

9. The clockspring assembly according to claim 8, wherein the indicium is a raised projection on the surface of the ribbon cable.

10. The clockspring assembly according to claim 9, wherein the raised projection projects radially outward from the surface of the ribbon cable.

11. The clockspring assembly according to claim 4, wherein the sensor is a tact sensor configured to engage a raised projection as the indicium when the raised projection moves past the sensor during relative rotation of the hub and rotor.

12. The clockspring assembly of claim 1, further comprising an aperture formed in an outer circumferential wall of the hub and the indicator is a sensor being mounted in the aperture.

13. The clockspring assembly of claim 1, wherein the centering indicator includes a gear assembly driven by rotation of the rotor.

14. The clockspring assembly of claim 13, wherein the gear assembly includes a drive gear mounted for rotation with the rotor and a driven gear supported by the hub in a fixed location relative to the rotor.

15. The clockspring assembly of claim 14, wherein the drive gear is a ring gear fixedly mounted to the rotor.

16. The clockspring assembly of claim 14, wherein the driven gear rotates a threaded portion coupled to a non-rotatable follower member, the follower member moving axially with rotation of the threaded portion by the driven gear.

17. The clockspring assembly of claim 16, wherein the follower member includes a threaded part correspondingly engaging the threaded portion rotated by the driven gear, the follower member further including at least one electrical contact.

18. The clockspring assembly of claim 17, wherein the indicator further includes a switch configured to be engaged by the at least one electrical contact during axial movement of the follower member.

19. The clockspring assembly of claim 18, wherein engagement of the switch by the at least one electrical contact closes the switch indicating proper centering of the hub relative to the rotor.

20. The clockspring assembly of claim 1, wherein the rotor is mounted to a steering assembly of a motor vehicle and is rotatable with rotation of a steering column of the motor vehicle.

* * * * *